United States Patent [19]
Jeffers

[11] Patent Number: 5,700,594
[45] Date of Patent: Dec. 23, 1997

[54] MAGNETIC MEDIUM CAPABLE OF SUPPORTING BOTH LONGITUDINAL AND PERPENDICULAR RECORDING, AND METHOD OF MAKING SAME

[75] Inventor: Frederick John Jeffers, Escondido, Calif.

[73] Assignee: Eastman Kodak Company, Rochester, N.Y.

[21] Appl. No.: 385,613

[22] Filed: Feb. 9, 1995

[51] Int. Cl.$^6$ ............... G11B 5/70; G11B 5/712; G11B 5/714

[52] U.S. Cl. ............... 428/694 BA; 427/548; 427/130

[58] Field of Search ............... 428/694 BA, 694 BH, 428/694 B; 427/548, 127, 128, 130

[56] References Cited

U.S. PATENT DOCUMENTS

| | | | |
|---|---|---|---|
| 4,302,790 | 11/1981 | Lemke | 360/119 |
| 4,511,617 | 4/1985 | Hideyama et al. | 428/212 |
| 4,677,024 | 6/1987 | Kitahata et al. | 428/328 |
| 4,746,569 | 5/1988 | Takahashi et al. | 428/323 |
| 4,822,634 | 4/1989 | Takahashi et al. | 427/48 |
| 4,859,495 | 8/1989 | Peng | 427/48 |

OTHER PUBLICATIONS

"Magnetic Properties of Acicular $BaFe_{12}O_{19}$ Particles Prepared by Microwave Plasma Sintering", Fujita et al., IEEE Transaction on Magnetics, vol. 29, No. 3, Jul. 1993.

Primary Examiner—John J. Zimmerman
Assistant Examiner—Michael LaVilla
Attorney, Agent, or Firm—William F. Noval

[57] ABSTRACT

Acicular barium ferrite (BaFe) particles with magnetic easy axes perpendicular to particle length are utilized as the magnetic particles in the recording medium of the invention. The BaFe particles are coated to lie "side by side", onto the medium's substrate with the particles' lengths lying in the plane he medium and transverse to the direction of medium motion during recording. The optimum particle orientation for support of both perpendicular and longitudinal components is where the easy axes of the particles are randomly oriented in an X-Y plane wherein the X axis Ks along the direction of media motion, and the Y axis is perpendicular to the recording layer. To effect this random orientation, the just coated particles are subjected to a rotating magnetic field whose rotating vector lies in the X-Y plane. As the magnetic layer is transported through the field past the rotating vector, the lengths of the particles align parallel to the Z axis and the easy axes of the particles align with the changing rotating field causing them to assume random directions in the X-Y plane. A rotating magnetic field may be generated by scanning down a pre-magnetized magnetic layer consisting of alternating polarity magnetic segments. If the media substrate coated with the still liquid dispersion of the BaFe particles is passed over such a pre-magnetized surface, each point of the dispersion will experience a rotating magnetic field and the desired random orientation will be obtained. The rotating field may also be obtained by means of a rotating magnet.

3 Claims, 3 Drawing Sheets

1

MAGNETIC MEDIUM CAPABLE OF SUPPORTING BOTH LONGITUDINAL AND PERPENDICULAR RECORDING, AND METHOD OF MAKING SAME

BACKGROUND OF THE INVENTION

1. Field of the Invention

This invention relates to a magnetic recording medium, and to the method of making same.

2. Description Relative to the Prior Art

The trend in magnetic recording is in the direction of higher recorded areal density with continuing increases in both the recorded track density and the linear recording density. Improvements in the magnetic record/reproduce transducer and in the recording medium both contribute to this ongoing progress. One example is the improved high linear density recording system utilizing a microgap record head having a magnetic gap length of less than 15μ" disclosed in U.S. Pat. No. 4,302,790. The microgap record head provides increased high density performance when used with a conventional longitudinally magnetizable medium and, as disclosed in the above referenced patent, it provides even further improvement in performance when used with a medium that supports both perpendicular and longitudinal magnetization.

The magnetic particle of the medium referred to in the above patent is cobalt doped γFe$_2$O$_3$ whose cubic anisotropy supports both longitudinal and perpendicular magnetization but whose magnetic properties are both temperature dependent and subject to stress related degradation. A medium supporting both perpendicular and longitudinal magnetization utilizing an anisotropic particle not manifesting the above problems is disclosed in the instant invention.

SUMMARY OF THE INVENTION

Acicular barium ferrite (BaFe) particles having a very large magnetic crystalline energy with the easy or minimum energy axis perpendicular to the particle longitudinal axis are utilized as the magnetic particles in the recording medium of the invention. The BaFe particles dispersed in a binder are coated to lie with longitudinal axes parallel to each other, onto the medium's substrate with the particles longitudinal axes lying transverse to the direction of medium motion during recording. The optimum particle orientation for support of both perpendicular and longitudinal components is where the easy axes of the particles are randomly oriented in an X-Y plane wherein the X axis is along the direction of media motion, and the Y axis is perpendicular to the recording layer. To effect this random orientation, the just coated particles in the still liquid binder are subjected to a rotating magnetic field whose rotating vector lies in the X-Y plane. As the magnetic layer is transported through the rotating vector field, the easy axes of the particles align with the changing rotating field causing them to assume random directions in the X-Y plane while simultaneously causing the longitudinal axes of the particles to physically align with the Z axis. A rotating magnetic field may be generated by scanning down a pre-magnetized magnetic layer where the pre-magnetized layer consists of alternating polarity magnetic segments. The pre-magnetized magnetic layer may either be perpendicularly or longitudinally recorded, or some combination of the above; in either case a rotating vector field exists above the scanned layer. If the media substrate coated with the still liquid dispersion of the BaFe particles is passed over such a pre-magnetized surface, each point of the dispersion will experience a rotating magnetic field and the desired physical random easy axis orientation will be obtained. The rotating field may also be obtained by means of a rotating magnet.

Additionally, the medium of the invention is particularly suited for short wavelength recording. The magnetic moment of a recording particle is only stable when it is in a single domain state, i.e. the magnetization is uniform. At high linear density, the bit length can approach, or be even smaller than the particle length. This requires the existence of an unstable "head-on" 180 degree domain wall in the particle, and gives rise to a significant source of high density signal loss. This problem does not arise in the disclosed medium as the particle longitudinal axis lies perpendicular to the direction of medium travel, and the short wavelength recorded magnetization lies not along the longitudinal axis of the particle, but along the particle's short dimension, normal to its longitudinal axis.

BRIEF DESCRIPTION OF THE DRAWINGS

The invention will be described with respect to the drawings of which.

DESCRIPTION OF THE PREFERRED EMBODIMENTS

Figure 1A:
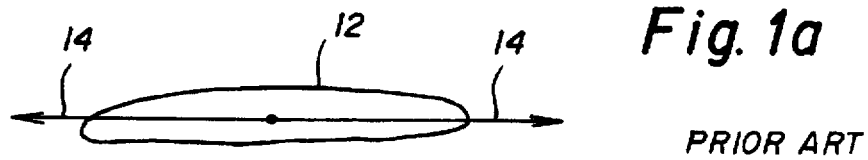
FIG. 1a is a drawing of an acicular magnetic particle known in the prior art.
Figure 1B:
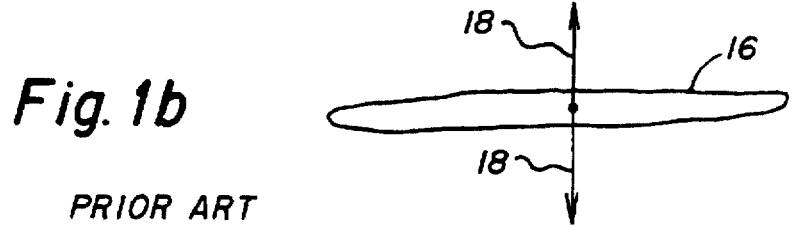
FIG. 1b is a drawing of a recently disclosed acicular magnetic particle of the prior art.

Referring to FIG. 1a, a magnetic particle 12 conventionally used in media of the prior art has its easy axis 14 lying along the longitudinal axis of the magnetic particle 12. A particle supports magnetization along the direction of its easy axis, and as the particle longitudinal axis in the prior art is generally oriented in the medium to lie along the direction of motion of the media during recording, such a magnetic particle 12 can only support longitudinal recording. Referring to FIG. 1b, the magnetic particle 16 used in the medium of the present invention has its easy axis 18 lying perpendicular to the longitudinal axis of the magnetic particle 16. The magnetic particle 16 is an acicular barium ferrite particle having the preferred formulation, BaFe$_{12}$O$_{19}$, prepared as described in the article entitled "Magnetic Properties of Acicular BaFe$_{12}$O$_{19}$ Particles Prepared by Microwave Plasma Sintering", by Fujita et al, appearing at page 2129 of the *IEEE TRANSACTIONS ON MAGNETICS*, VOL. 29, NO. 3, JULY 1993.

Figure 2:
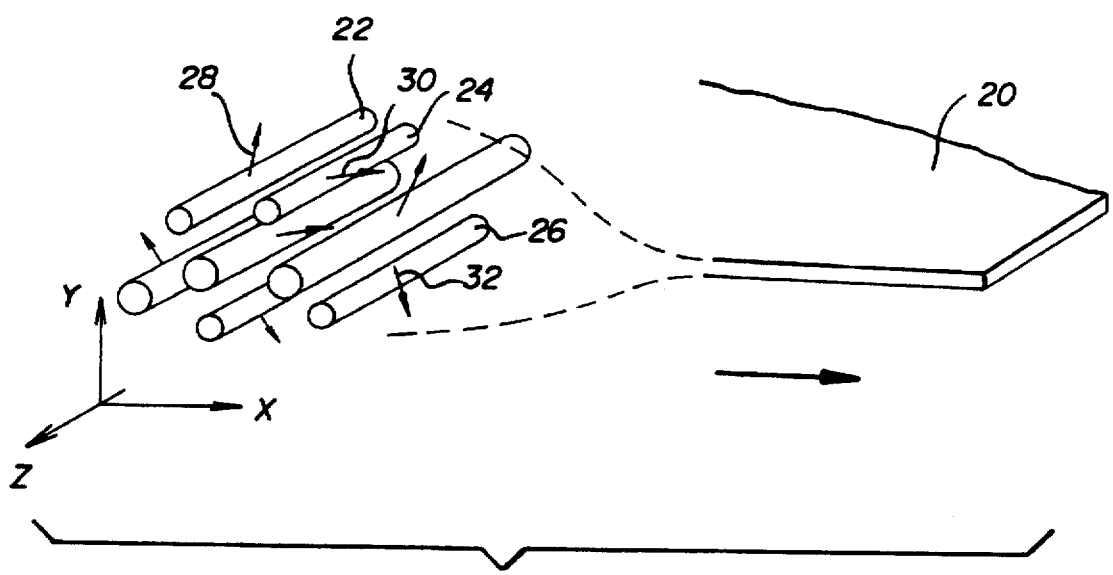
FIG. 2 is a drawing showing the physical orientation of acicular particles in the medium of the invention.

In the medium of the invention, represented in FIG. 2 as a magnetic tape 20, BaFe particles, e.g. 22,24,26, having the magnetic characteristics of the particle 16, are oriented as shown in FIG. 2. Coordinate axes X, Y, Z, are oriented as shown in FIG. 2, and the magnetic tape 20 lies in the X-Z plane with the longitudinal length of the tape 20 lying along the X axis direction. The acicular magnetic particles, e.g. 22,24,26 are stacked in the tape 20 so that their longitudinal axes are oriented in the direction of the Z axis, with the result that the stacks of magnetic particles, e.g. 22,24,26 as coated in the tape 20 lie in planes parallel to the Z axis. As the easy axes, e.g. 28,30,32 of the magnetic particles, e.g. 22,24,26 are perpendicular to the longitudinal axes of the magnetic particles, the easy axes, e.g. 28,30,32 resultantly lie in planes parallel to the X-Y plane.

Figure 3:
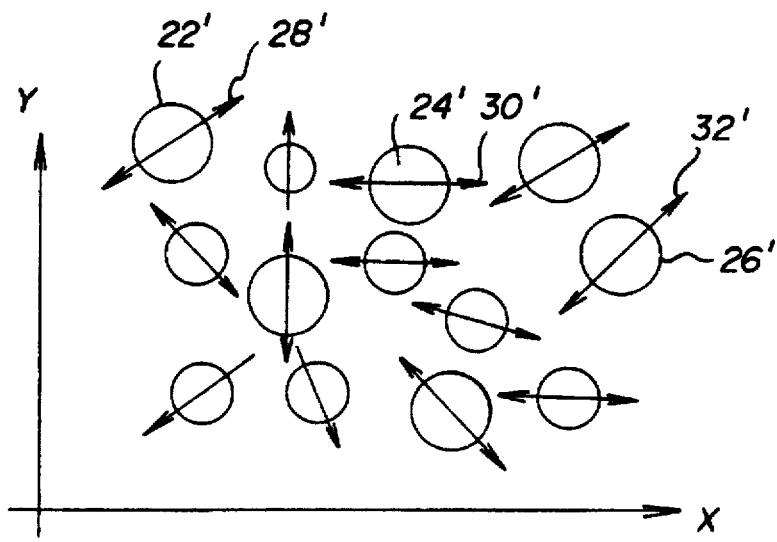
FIG. 3 is an illustration showing the random orientation of the easy axes of the magnetic particles used in the invention.

The optimum magnetic orientation of the magnetic particles, e.g. 22,24,26 so as to generate both longitudinal,X, and perpendicular,Y, magnetization components during recording, is where the easy axes, e.g. 28,30,32 are randomly distributed in the X-Y plane. Referring to FIG. 3, the magnetic particles, e.g. 22',24',26' are viewed end on, and the easy axes, e.g. 28',30',32' are seen randomly oriented in the X-Y plane. (In the drawings, different but related elements are identified with the same reference characters, albeit that corresponding elements in the various drawings are distinguished by the use of primes.)

Figure 4A:
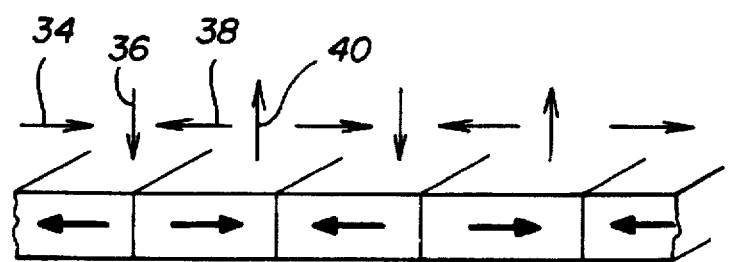
FIG. 4a is a drawing of a first method of obtaining a rotating magnetic vector field known in the prior art.
Figure 4B:
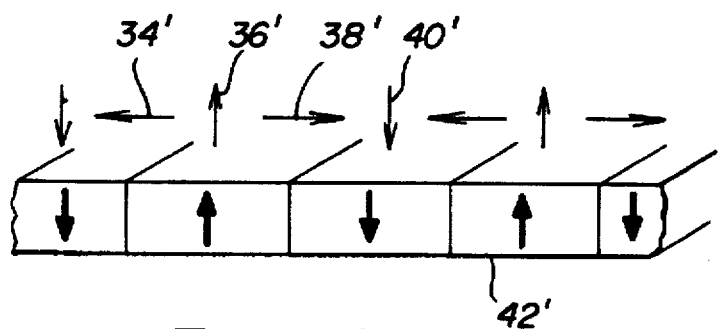
FIG. 4b is a drawing of a second method of obtaining a rotating magnetic vector field known in the prior art.

The technique for randomizing the easy axes directions in the preferred embodiment may be understood by referring to FIGS. 4a and 4b. It is known in the art that a rotating magnetic field, e.g. 34,36,38,40 (FIG. 4a) or 34',36',38',40' (FIG. 4b) is realizable by scanning across a magnetic layer 42 (FIG. 4a) or 42' (FIG. 4b) of alternating magnetic polarity segments. The segments may be either longitudinally magnetized (FIG. 4a), or perpendicularly magnetized (FIG. 4b); similar rotating fields, differing only in phase, are generated when the layers are scanned.

Figure 5:
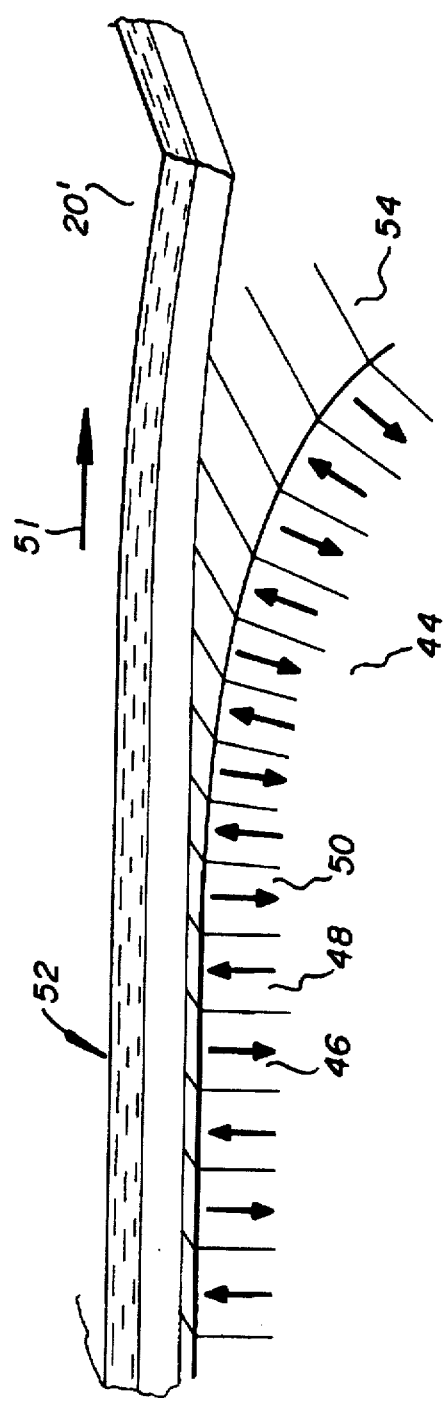
FIG. 5 is a drawing of a technique for physically aligning and randomly orienting the easy axes of the particles of the medium of the invention by use of a pre-magnetized surface.
Figure 6:
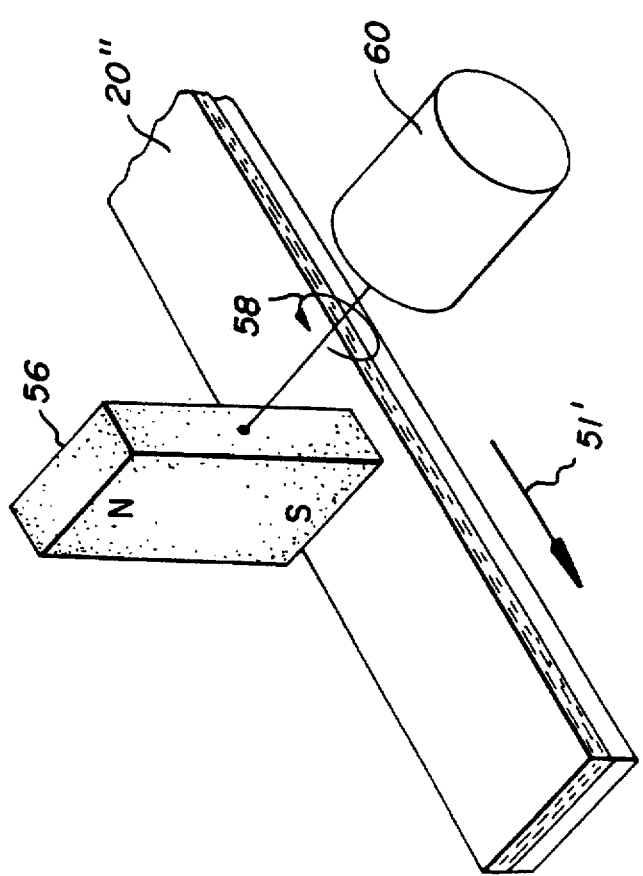
FIG. 6 is a drawing of a rotating magnet used to physically align and randomize the easy axes' directions in the medium of the invention.

To provide a rotating magnetic field to align the particles' easy axes in the X-Y plane, the concept of FIGS. 4a and 4b is incorporated into the structure shown in FIG.5. A pre-magnetized surface 44 having alternating polarity magnetization elements, e.g. 46,48,50 is positioned so that the tape travels in the direction of the arrow 51 over the pre-magnetized surface 44. The magnetic particles in the still liquid dispersion 52 passing over the pre-magnetized surface 44 experience a rotating field which physically aligns the particles with their long axes parallel to the Z axis and, randomly orients the easy axes in the X-Y plane as explained supra. The pre-magnetized surface 44 tapers down at one end 54 so that the rotating magnetic field gradually decreases in magnitude over many field cycles as the tape 20' moves away from the magnetized surface 44, leaving the coated tape 20' in a demagnetized state and results in a randomization of the directions of the particles' easy axes. It will be noted that the pre-magnetized surface may be structured either from a series of alternating permanent magnets, or may be a layer of alternately recorded magnetic recording medium. As an alternate embodiment to provide a rotating magnetic field, a permanent bar magnet 56 may be rotated by a motor 60 in the direction of the arrow 58 in the X-Y plane above the moving tape 20', as shown in FIG. 6.

The invention has been described in detail with particular reference to preferred embodiments thereof, but it will be understood that variations and modifications can be effected within the spirit and scope of the invention.

What is claimed is:

1. Magnetic medium comprising:

a substrate having mutually perpendicular length, width and depth dimensions;

a magnetic layer on said substrate, said layer including acicular magnetic particles, each of said particles having a longitudinal axis and having an easy magnetic axis perpendicular to said longitudinal axis; wherein said particles are oriented such that said longitudinal axes of said particles are parallel to each other and are parallel to said width dimension; wherein said easy magnetic axes of said acicular magnetic particles are randomly oriented at polar angles of 0°–360° relative to said longitudinal axes; such that said magnetic medium exhibits during recording longitudinal and perpendicular magnetization components.

2. The magnetic medium of claim 1 wherein said acicular magnetic particles are barium ferrite particles.

3. The magnetic medium of claim 2 wherein the composition of said barium ferrite particles is $BaFe_{12}O_{19}$.

* * * * *